United States Patent
Brown et al.

(10) Patent No.: US 7,641,124 B2
(45) Date of Patent: Jan. 5, 2010

(54) MAGNETIC DATA RECORDING DEVICE

(75) Inventors: Kerry D. Brown, Portola Valley, CA (US); David K. Pariseau, Los Altos, CA (US); Weidong Li, Mountain View, CA (US); Edgar M. Williams, Palo Alto, CA (US); Joyce Thompson, Menlo Park, CA (US)

(73) Assignee: Qsecure, Inc., Los Altos, CA (US)

( * ) Notice: Subject to any disclaimer, the term of this patent is extended or adjusted under 35 U.S.C. 154(b) by 652 days.

(21) Appl. No.: 11/479,897

(22) Filed: Jun. 30, 2006

(65) Prior Publication Data

US 2007/0241201 A1    Oct. 18, 2007

Related U.S. Application Data

(63) Continuation-in-part of application No. 11/404,660, filed on Apr. 14, 2006, now Pat. No. 7,543,739, and a continuation-in-part of application No. 10/738,376, filed on Dec. 17, 2003, now Pat. No. 7,044,394.

(51) Int. Cl.
*G06K 19/06* (2006.01)

(52) U.S. Cl. .................... 235/493; 235/492; 235/451

(58) Field of Classification Search ................ 235/493, 235/492, 449, 380, 451
See application file for complete search history.

(56) References Cited

U.S. PATENT DOCUMENTS

| | | | |
|---|---|---|---|
| 5,180,902 A | 1/1993 | Schick | |
| 5,317,636 A | 5/1994 | Vizcaino | |
| 5,434,398 A | 7/1995 | Goldberg | |
| 5,623,552 A | 4/1997 | Lane | |
| 5,627,355 A | 5/1997 | Rahman | |
| 5,818,030 A | 10/1998 | Reyes | |
| 5,834,747 A | 11/1998 | Cooper | |
| 6,089,451 A | 7/2000 | Krause | |
| 6,206,293 B1 | 3/2001 | Gutman | |
| 6,308,890 B1 | 10/2001 | Cooper | |

(Continued)

*Primary Examiner*—Edwyn Labaze
(74) *Attorney, Agent, or Firm*—Richard B. Main (57) ABSTRACT

A Q-Chip MEMS magnetic device comprises a thin-film electronic circuit for implantation in the Track-2 area of a magnetic stripe on the back of a credit card. The Q-Chip MEMS magnetic device periodically self-generates new subsets of magnetic data that are to be read in combination with other magnetic data that is permanently recorded in the surrounding surface of the magnetic stripe. A collocated battery and microcontroller provide operating power and new data for magnetic bit updates. A swipe sensor triggers such updates by sensing electrical contact with a legacy card reader. Several thin-film coils of wire are wound end-to-end around a common, flat, ferrous core. These are driven by the microcontroller. In one instance, such core comprises "hard" magnetic material with a coercivity of 200-300 Oersteds. Magnetic data written from the corresponding adjacent coils will persist for later readings by a legacy card reader. In another instance, the core comprises "soft" magnetic material with a coercivity of about one Oersted. A media stripe of "hard" magnetic film material overlays respective coils to receive magnetic data transfers. Magnetic data written from the corresponding adjacent coils will persist in the overlaying hard media for later readings by a legacy card reader. In a data input mode, the thin-film coils can be used as readers to provide updates and new programming to the microcontroller.

15 Claims, 5 Drawing Sheets

U.S. PATENT DOCUMENTS

| | | |
|---|---|---|
| 6,510,983 B2 | 1/2003 | Horowitz |
| 6,592,044 B1 | 7/2003 | Wong |
| 6,636,833 B1 | 10/2003 | Flitcroft |
| 6,764,005 B2 | 7/2004 | Cooper |
| 6,853,412 B2 | 2/2005 | Stephenson |
| 6,954,133 B2 | 10/2005 | McGregor |
| 2002/0096570 A1 | 7/2002 | Wong |
| 2004/0123132 A1 | 6/2004 | Montgomery |
| 2004/0133787 A1 | 7/2004 | Doughty |
| 2005/0001711 A1 | 1/2005 | Doughty |
| 2005/0043997 A1 | 2/2005 | Sahota |

MAGNETIC DATA RECORDING DEVICE

RELATED APPLICATIONS

This Application is a continuation-in-part of U.S. patent application Ser. No. 11/404,660, filed Apr. 14, 2006 now U.S. Pat. No. 7,543,739, by two of the present inventors, Kerry D. BROWN and David K. PARISEAU, and titled AUTOMATED PAYMENT CARD FRAUD DETECTION AND LOCATION. Such patent application was, in turn, a continuation-in-part of U.S. application Ser. No. 10/738,376, filed Dec. 17 2003, now issued U.S. Pat. No. 7,044,394 B2, issued May 16, 2006, and both documents are incorporated herein by reference.

BACKGROUND OF THE INVENTION

1. Field of the Invention

The present invention relates to magnetic data recording devices, and more particularly to thin-film micro electromechanical system (MEMS) electronic devices placed in magnetic stripes that provide for a dynamic part of an otherwise static data recording.

2. Description of Related Art

Magnetic data recordings have been an important medium for use in video, audio, and computer data storage. Tapes have been configured on reels, cassettes, and cartridges. Short segments of magnetic stripes on the backs of credit, payment, and identity cards are ubiquitous ways to make wallet cards machine readable and more secure. Such magnetic stripes on credit cards have enabled worldwide use in merchant point-of-sale (POS) terminals.

Jacob Wong describes a credit card (11) with a magnetic stripe (12) on the back, in U.S. Pat. No. 6,592,044, issued Jul. 15, 2003. Such patent is incorporated herein by reference. The card described by Wong is intended to be read by a standard POS card reader, and has the conventional three tracks of data (13-15) common to modern payment cards. A small encoder (16,25) is embedded in the magnetic stripe, e.g., a part of the middle track (15). The encoder provides for the generating of a data packet that "can contain a personal coupon and an alias." Such personal coupon is produced by a collocated and embedded microprocessor (16) after a personal identification number (PIN) is input into the card. Wong explains that Track-1 was originally defined by the International Air Transport Association (IATA), and records seventy-nine alpha-numeric characters recorded at 210-bpi. Conventionally, it contains the cardholder's name, account, and discretionary data. Track-2 was originally defined by the American Banking Association (ABA), and this is the track that is read by ATMs and credit card readers. It records forty binary coded decimal (BCD) characters at 75-bpi. Wong's encoder is placed in one segment of this track and occupies less than all forty character positions. The ABA track specifications have been adopted by all the major banks in the world. Track-2 has data fields used to record the cardholder's account number, expiration date, possibly an encrypted PIN, and bank or card issuer discretionary data. Track-3 was used by ATM machines for withdrawal limits or history, and is still included for future definition and use, but it still as yet has not found any standardized widespread use. It provides for 107 BCD characters recorded at 210-bpi.

The problem that developed with conventional credit cards was that the data recorded on the magnetic stripe could be easily duplicated or "skimmed" off the card. The data collected was valid everywhere for every transaction until the victim detected and reported the theft. The better solution was to make each access number unique for each transaction, so that data from a skimmed card became instantly obsolete when the cardholder used it in a valid transaction. A card that does just this is described in U.S. patent application Ser. No. 11/404,660, filed Apr. 14, 2006, by the present inventor, Kerry Dennis BROWN, and titled AUTOMATED PAYMENT CARD FRAUD DETECTION AND LOCATION.

Implementing the electronics that can change all or parts of the magnetic recording on the magnetic stripe of a credit card is difficult and challenging. Everything must fit within a very thin flexible plastic card, and such must be compatible with all legacy card readers. Requiring special card readers will prevent all but limited acceptance. The generating and writing of the new magnetic data for the next transaction requires some kind of energy source, and flat thin batteries are the most practical. These batteries must provide a useful service life, e.g., at least two years in normal use. The per-card manufacturing costs also need to be low enough to make widespread deployment practical and affordable. Some of these costs might be absorbed by the savings gained by reducing skimming fraud, but in general the cards including these technologies need to be a few dollars per card in volume.

What is needed is a magnetic encoder or device that can be embedded in the Track-2 area of a magnetic stripe on a credit card. Such must be reliable and effective, and it must provide years of service life in this embodiment at only a few cents per unit. The prior art has not recognized that maintaining the magnetic data writing currents for more than a very brief period per use will drain the on-board batteries too quickly. New, improved batteries in the future are expected to live longer and have fewer materials issues.

Conventional devices and methods have not appreciated the problems in aligning the data bits from the encoder properly with the statically recorded bits in the rest of the magnetic stripe. Prior art devices do not address the changes in field amplitude matches that can occur with different card swiping speeds. They further have not provided or suggested solutions for the magnetic and mechanical discontinuities that can occur when a thin-film circuit is embedded in a magnetic stripe.

SUMMARY OF THE INVENTION

Briefly, a Q-Chip MEMS magnetic device embodiment of the present invention comprises a thin-film electronic circuit embedded in part of the Track-2 area of a magnetic stripe on the back of a credit card. The Q-Chip MEMS magnetic device periodically self-generates new sub-sets of magnetic data that are read in combination with other permanently recorded magnetic data in the surrounding surface of the magnetic stripe. A collocated battery and microcontroller provide operating power and new data for magnetic bit updates. A swipe sensor triggers such updates by sensing electrical contact with a legacy card reader. Alternatively, the update may occur periodically based on time, or it may occur via some external stimuli such as the entering of a PIN number or the validation of some biometric parameter. Several thin-film coils of wire are wound end-to-end around a common, flat, ferrous core. These coils are individually driven by the microcontroller.

An advantage of the present invention is that a payment card is provided that is compatible with existing legacy payment card systems and infrastructure.

A further advantage of the present invention is that a payment card is provided that has a long service life.

A still further advantage of the present invention is that a magnetic device is provided that once embedded can blend its magnetic data with permanent recordings in a magnetic stripe.

Another advantage of the present invention is a payment card is provided that can dynamically generate a new account number each it is used, and by doing so, immediately authenticate itself to the transaction infrastructure.

Another advantage of the present invention is that a payment card is provided that is far more difficult to copy or skim compared to conventional magnetic stripe cards.

A further advantage is a magnetic device is provided that can maintain its magnetic data after updating without using battery power.

Another advantage is that swipe speed of the card within the reader will not result in a divergence of field strength between the static magnetic media, and the dynamic media on the Q-Chip.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
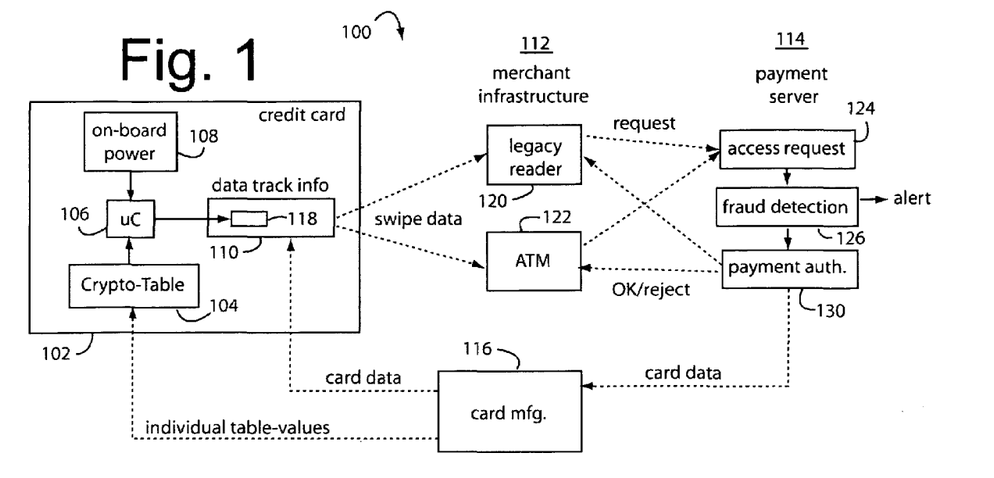
FIG. 1 is a functional block diagram of a payment card system embodiment of the present invention.

FIG. 1 illustrates a QSECURE™ payment card system embodiment of the present invention, and is referred to herein by the general reference numeral 100. System 100 greatly reduces the risks of fraud by credit card skimming or data mining from merchant cached data, and yet remains compatible with the vast installed base of magnetic payment card readers in the world.

The various embodiments possible all share a common core set of technologies. Every basic embodiment includes a card 102 in a credit-card format, a crypto-table or run-time cryptographic algorithm 104, a microcontroller 106 to access the crypto-table or run the cryptographic algorithm, an on-board power source 108, a data track 110 that is partially affected by the microcontroller according to crypto-table or locally derived values, a reader means 112 to communicate the data track information to a payment server 114, and a host server 114 to authenticate the data track information. The dimensions, materials, magnetics, recordings, and data formats used by card 102 are dictated by industry "ISO standards" for bank payment cards. The other components described here must fit within these constraints. The merchant infrastructure and payment server represented in FIG. 1 are typical, many other variations exist but still can benefit from embodiments of the present invention.

The crypto-table 104 can be used to store a set of values that have been cryptographically pre-computed by a card manufacture 116 and preloaded into a table. The values are accessed by the on-board microcontroller when the card 102 is swiped by a merchant 112. These table values are such that a next valid value cannot be predicted from a presently valid value being used in a current transaction. The whole table of values is only valid for the particular card they are carried in, and compromising them will not assist a hacker in breaching any other card or account. An on-board crypto-engine would not have this particular advantage, but may be superior to a simple crypto-table in some applications.

The microcontroller (µC) 106 is awakened, e.g., by a swipe sensor, when the card is to be used. A next crypto-table value is accessed when needed. Swiping triggers the sending of a result to a Q-Chip MEMS magnetic device 118 in data track 110. The Q-Chip MEMS magnetic device 118 appears, e.g., to a legacy card reader 120 as a portion of the whole magnetically recorded access number. But the part of the access number provided by the Q-Chip MEMS magnetic device 118 can be internally re-written for each transaction.

"Hard" magnetic materials, e.g., with coercivities high enough to support the magnetic data persistence needed to retain the magnetic data after being pulse-written, are included in the Q-Chip MEMS magnetic device 118. The card readers must be able to read the data long after the initial writing, thereby conserving battery power. But if the coercivity of the hard magnetic materials is too high, then excessive currents in the writing coils will be needed to flip the magnetic bits. This higher currents, if feasible, can severely limit battery life. So a compromise is needed. Coercivities in the range of 50-600 Oe seem practical at this point in the development. Experimentation and practical experience in actual mass consumer use is needed to refine these parameters. Early experiments and prototypes indicate hard materials with 200-300 Oe is a promising range of compromise. In future, better batteries should allow higher value materials to be used, e.g., 400 Oe.

Card 100 does not have to execute an encryption process. The numbers can be stored in the table during manufacturing. These numbers can be encrypted using a seed connected with the user, or they may be chosen at random and then ordered. The essential idea is that the next valid number cannot be predicted from any numbers that were used before. The payment server 114 allows some mis-synchronization for what should be the next valid number, within a range of next valid numbers such as it already knows are associated with the particular card.

The means to communicate information read from the data track 110 to a host server 114 preferably relies on presently deployed legacy card readers 120 and automated teller machines (ATM's) 122 to forward a swipe data to host server 114 for authentication and payment. Each request is scanned by an access request program 124. If acceptable so far, the payment request is forwarded to a fraud detection program 126. Acceptable crypto-table values that were created during card manufacturing 116 are computed in the fraud detection program 126 in real-time use as they are presented so they do not need to be stored by the payment server 114. An alert can be issued if the value was presented before and used without incident. If no fraud is detected, and payment authority is verified, a payment authorization program 130 sends an authorization code to the legacy card reader 120 or ATM 122.

An add-on program for the host server 114 is provided with its own list of crypto-table values that were loaded into each card during manufacture, and checks these against what it receives in payment requests. The server limits each value to one use, and the location and time of each use are logged. The management of the valid-number window on the server can be set up such that unused numbers expire a fixed time after a later number is received.

A timer can be included in the card in alternative embodiments of the present invention. Such timer is activated on a trigger event, and prevents any other dynamic numbers from being generated until a pre-determined time has elapsed. If the timer times-out, a next transaction number is skipped and a new count is reset. This prevents copies of magstripe data from being accepted in a decision making process to authorize the transactions after a fixed period of time.

Figure 2:
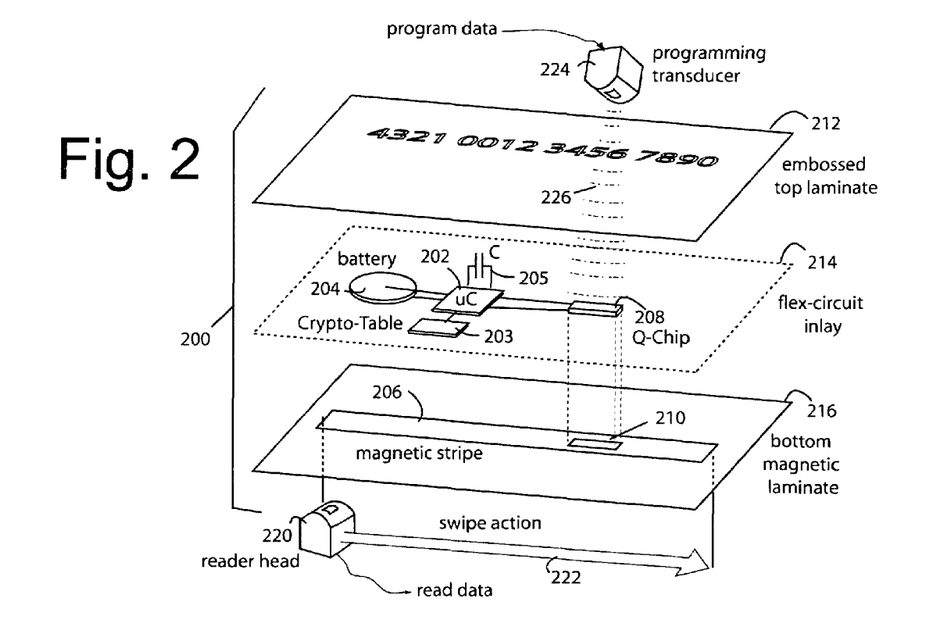
FIG. 2 is a perspective diagram of a payment card embodiment of the present invention.

As shown in FIG. 2, a credit card 200 has a flexible circuit sandwiched between two outer plastic laminates. It functions and appears to be an ordinary credit card. A microcontroller (μC) 202 and crypto-table memory 203 are powered by a battery 204. Alternatively, a photovoltaic cell, and/or piezoelectric strain generator can be used to provide operating power. Magnetic stripe 206 includes account access information to be presented during a transaction. A Q-Chip MEMS magnetic device 208 implements the programmable part 118 in FIG. 1.

An electrical conductivity sensor is included within the Q-Chip 208 to detect when the card is being swiped in a legacy card reader, and when the microcontroller should be activated. The microcontroller is activated only long enough to write the new magnetic data, and the persistence of the magnetic material is relied upon to keep this data presentable for a card reader. In alternative embodiments, the embossed account numbers are replaced by a numeric display which is activated by a finger press on an included "Q-button". In such a transaction the magnetic information on the card is not used, instead the card number, expiration date and the card validation/verification value (CVV, CVV2) can be used to effect a transaction. One method to prevent accidental button presses includes slotting the Q-button to fit a typical finger and requiring a minimum time before activation.

Payment card 200 resembles a typical payment or bank/ATM card, but may be a little thicker to accommodate the electronics sandwiched inside. The payment card industry has published standards (such as ISO/IEC-7810, ISO/IEC-7811(-1:6), and ISO/IEC-7813, available from American National Standards Institute NYC, NY), for all aspects of payment cards, and these regulate the card size, thickness, tolerance to flexing, positioning of account numbers and user information, magnetic recording formats on the magnetic stripe on the back, etc. Payment card 200 is compatible with these and other industry standards so as to allow rapid assimilation into the payment card system and its use by consumers.

Payment card 200 comprises three pre-lamination layers 212, 214, 216, which are fused together. Other construction methods can be used, e.g., a solid cast material in which the electronics are embedded. The front layer 212 may include a digital user display for displaying a virtual personal account number (PAN). Some of the digits can be fixed and simply embossed and not electronically displayed. An alternative digital user display is used to display an expiration date. The middle layer 214 includes electronics for a virtual account number generator, a display controller, and a magnetic strip controller. The back layer 216 has a partially programmable magnetic stripe 206 and a printed card verification value (CVV, CVV2).

In order to personalize each card with user-specific data that may include the crypto-table, algorithm, unique keys, or similar after the basic hardware manufacturing is completed, there must some means to insert customized cryptographic information into each card in a post-manufacturing step. Very small needle probes could be inserted at the edge of the card to make contact with pads on a flex circuit to program the card. Or, these programming pads could be made electrically accessible from somewhere on the surface of the Q-Chip magnetic device. Another method comprises fixed electrical pads presented on the card surface.

Referring again to FIG. 2, a better approach is to provide an inductive or wireless coupling for a communication channel through the Q-Chip MEMS magnetic device back into the associated microcontroller. In the field, and in normal operation, a legacy card reader read head 220 is swiped 222 along the magnetic stripe 206 to gather the recorded card data. In personalization, a special program head 224 with a strong field strength is placed nearby to transmit a pulse and stream of data over an inductive or wireless interface 226. The Q-Chip MEMS magnetic device 208 senses the programming mode, and allows the program head 224 to stream personalization data through the interface to appropriate memory locations in the card electronics, e.g., μC 202. Once the programming and verification are completed, the interface 226 can be disabled so that this channel could not be used again.

The programmable magnetic stripe 206 can be like that described in U.S. patent application Ser. No. 10/738,376, filed Dec. 17, 2003, and titled PROGRAMMABLE MAGNETIC DATA STORAGE CARD; and also, U.S. patent application Ser. No. 10/800,821, filed Mar. 15, 2004, and titled THREE-LEGACY MODE PAYMENT CARD WITH PARAMETRIC AUTHENTICATION AND DATA INPUT ELEMENTS. Both are incorporated herein by reference.

The programmable magnetic stripe will typically have three tracks of data programming written on such by a magnetic card writer, e.g., by a card issuer. Parts of the magnetic stripe are subject to being reprogrammed from within the payment card itself. Such is advantageous if these parts comprise relatively low-coercivity magnetic materials chosen so that any magnetic recordings pressed upon them will dissipate and fade away after a predetermined time, e.g., a few minutes. This helps make sure any new account numbers internally generated and written to the magnetic stripe will only be used once and only in a valid transaction. After the recordings have faded away, the card can be used again, but only after a new account number is generated internally. The new account numbers will be unique to each transaction and merchant, so fraud detection is made possible at the issuing banks' payment processing servers.

The basic Q-Chip MEMS magnetic device 208 generally comprises several thin-film coils of wire are wound end-to-end around a common, flat, magnetic, possibly ferrous, core. These coils are individually driven by the microcontroller. In one instance, such core includes a so-called "hard" magnetic material with a coercivity of 50-600 Oe. The hard magnetic material can serve either as a core material wrapped by the conducting coils, or as the magnetic medium where magnetic data resides. Magnetic data written from corresponding adjacent coils wrapped around a "soft" core will persist on the hard medium about as long as data written directly on a "hard" core without a any overlaying medium.

If the wound core is made of a "soft" saturable magnetic material with a coercivity of about one Oersted, and a separate media stripe of "hard" magnetic film material overlays respective coils to receive magnetic data transfers from the coils and soft core, then such configuration is referred to herein as a soft magnetic core with hard medium, or simply "soft core".

Magnetic data will persist for a long time in the overlaying hard media. A legacy card reader could read these recorded data months later, although it may be advantageous to extend or shortened this time for specific applications.

In a data input mode, thin-film coils with multiple taps can be used as readers to provide updates and new programming to the microcontroller. In this instance, the coil can receive information from specialized interface hardware that induces a changing magnetic field in the core, with such information then being converted to an electronic signal in the coil(s). This signal is then wave-shaped by the electromagnetic circuitry of the Q-chip and transferred to the microcontroller for digital interpretation and storage. Such a link can be used in manufacturing for programming the microcontroller, and may also be used in a payment environment for firmware updates, etc.

The implementation of payment card 200 is challenging in that all the electronics need to be very thin and low power. The digital displays must be flexible, and any embedded battery needs to be able to operate the electronics for at least one year of typical use. Conventional, albeit advanced technologies are presently available to fabricate payment card 200 as described. Therefore, a detailed description of those fabrication methods is not necessary here.

Some of the digits of the virtual account number in any display may be fixed. Such fixed numbers can be embossed or printed and not electronically represented. Similarly, some of the data related to the virtual account number and encoded to the magnetic stripe may also be fixed. The fixed bits can be recorded externally by a card writer, while the rest are electronically programmable from within. The fixed bits can represent the card type, and the bank number, e.g., the first 4-5 numbers of the personal account number. There can be some security benefits realized by not writing or displaying the virtual account numbers until they are actually going to be used.

In the past, the magnetic recordings laid down in the three tracks had some latitude in their exact placement on the magnetic stripe. However, payment card 200 will require that these recordings be properly aligned with the data being represented by the magnetic Q-Chip MEMS magnetic device 208 that sits inside under a window 210. The mesh of the two magnetic data must be accurate to within one recorded bit, or else guard bit positions must be provided to accommodate slight misalignments. A specialized card writer is also required for this purpose that can read and store the original recordings, sense the location of the magnetic Q-Chip MEMS magnetic device 208, and write the recordings back in their properly aligned positions.

There are two modes of use for payment card 200, e.g., Card-Not-Present and Card-Present. More specially, Card-Not-Present is used for online Internet use where no card reader can be present, e.g., "card not present" transactions or mail-order/telephone-order by fax, mail, phone, email, instant messaging, etc. The user must manually read off to the merchant the virtual account number and the expiration date, e.g., over the telephone or entered into an order form on a website.

A new valid use-once account number may appear in user display, e.g., in response to some stimulus, like the pressing of a membrane switch button or sequence. Card-Present relates to point-of-sale (POS) use where a merchant card reader is present. The virtual account number and expiration date are machine-read by a magnetic card reader. A new valid use-once account number will appear in the data fields of magnetic stripe 118, e.g., again in response to some stimulus like sensing the swiping of the card in the reader. The sending of the virtual account number to the user display and magnetic stripe 118 can be independent, or they can be coordinated in the case of a Card-Present POS transaction where the merchant is required to read off the last four account numbers and key them manually into the card reader.

A magnetic array is arranged on the back of the card 102 behind the magnetic stripe 118. This presents what appears to be an ordinary magnetic stripe encoded with appropriate bank and user information for a conventional magnetic card reader. Such readers are ubiquitous throughout the world at point-of-sale terminals, and therefore it is very important not to require any changes to these readers in order to accommodate the proper use of payment card 200.

An embedded power source is needed by payment card 200 that can last for the needed service life of a typical card, e.g., about eighteen months to four years. A chemical or MEMS battery or a piezoelectric generator and charger can be used. Such a piezoelectric generator converts incidental temperature excursions and mechanical flexing of the card into electrical power that can charge a storage capacitor or help maintain the battery. A piezoelectric crystal is arranged to receive mechanical energy from card flexing, geo-magnetic induced stress, thermally-induced stress, mechanically-induced stress, and/or keypad use. The charger converts the alternating current (AC) received into direct current (DC) and steps such up to a voltage that will charge the battery. Alternative embodiments can include embedded photovoltaic cells to power the card or charge its battery.

A conventional, "legacy", merchant point-of-sale magnetic-stripe card reader 120 is used to read user account data recorded on a magnetic stripe 206 on the payment card 200. Such is used by a merchant in a traditional way, the payment card 200 appears and functions like an ordinary debit, credit, loyalty, prepay, and similar cards with a magnetic stripe on the back.

User account data is recorded on the magnetic stripe 206 using industry-standard formats and encoding, for example, ISO/IEC-7810, ISO/IEC-7811(-1:6), and ISO/IEC-7813. These standards specify the physical characteristics of the cards, embossing, low-coercivity (e.g., 300-650 Oe) magnetic stripe media characteristics, location of embossed characters, location of data tracks 2-3, high-coercivity (e.g., 2500-4000 Oe) magnetic stripe media characteristics, and financial transaction cards. A typical Track-1, as defined by the International Air Transport Association (IATA), is seventy-nine alphanumeric characters recorded at 210-bits-per-inch (bpi) with 7-bit encoding. A typical Track-2, as defined by the American Bankers Association (ABA), is forty numeric characters at 75-bpi with 5-bit encoding, and Track-3 (ISO/IEC- 4909) is typically one hundred and seven numeric characters at 210-bpi with 5-bit encoding. Each track has starting and ending sentinels, and a longitudinal redundancy check character (LRC). The Track-1 format includes user primary account information, user name, expiration date, service code, and discretionary data. These tracks conform to the ISO/IEC/IEC Standards 7810, 7811-1-6, and 7813, or other suitable formats.

The magnetic stripe 206 is located on the back surface of payment card 200. A data generator, e.g., implemented with, microprocessor 202 and crypto-table 203, receives its initial programming and personalization data from a data receptor. For example, such data receptor can be implemented with the Q-Chip coils themselves or a serial inductor placed under the magnetic stripe. This is then excited by a standard magnetic card writer. Additionally, the data may be installed at the card issuer, bank agency, or manufacturer by existing legacy methods. The data received is stored in non-volatile memory. Alternatively, a data receptor can be a radio frequency antenna and receiver, typical to ISO/IEC/IEC Specifications 24443 and 25693. The data generator may be part of a secure processor that can do cryptographic processing, similar to Europay-Mastercard-Visa (EMV) cryptoprocessors used in prior art "smart cards".

Card-swipes generate detection sensing signals from one or a pair of detectors. These may be embedded at one or each end of magnetic stripe 206 and can sense the pressure and/or ohmic contact applied by a magnetic read head in a scanner. Alternatively, an electrical contact film over the magnetic stripe itself can be used as a switch to trigger the electronics.

Embodiments of the present invention combine parallel fixed-position write heads on one side of a thin, planar magnetic media, and a moving serial read head on the opposite side. Such operation resembles a parallel-in, serial-out shift register.

The legacy card reader 120 is a conventional commercial unit as are already typically deployed throughout the world, but especially in the United States. Such deployment in the United States is so deep and widespread that conversion to contact and contactless smartcard systems has been inhibited by merchant reluctance for more purchases, employee training, counter space, and other concerns.

Such is an important aspect of the present invention that the outward use of the payment card 200 not require any modification of the behavior of the user, nor require any special types of card readers. Such is a distinguishing characteristic and a principle reason that embodiments of the present invention are commercially successful. The card reader 120 has a magnetic-transducer read head that is manually translated along the length of data stripe.

The magnetic-transducer in the Q-Chip MEMS magnetic device 208 must be very thin and small, as they must fit within the relatively thin body of a plastic payment card, and be packed dense enough to conform to the standard recording bit densities in the respective tracks. Integrated combinations of micro-electro-mechanical (MEMS) systems, nanotechnology, and longitudinal and perpendicular ferromagnetics are therefore useful in implementations that use standard semiconductor and magnetic recording thin-film technologies.

Figure 3:
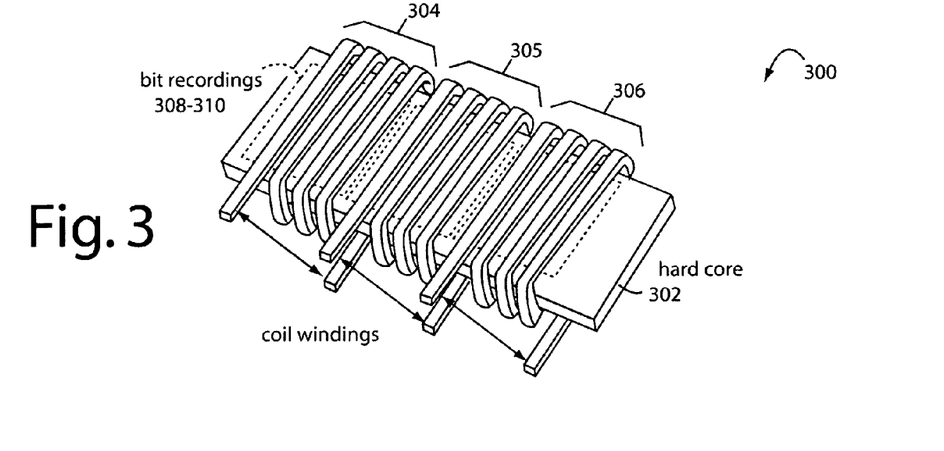
FIG. 3 is a perspective diagram of a Q-Chip MEMS magnetic device embodiment of the present invention that uses a hard magnetic core with individual coil windings.

FIG. 3 represents a Q-Chip magnetic device 300 that uses a "hard" magnetic core/medium 302. Here, the word "hard" is used to describe magnetic material that has a coercivity of 50-600 Oe. As such, magnetic data written by three representative coils 304-306 will persist as bit recordings 308-310. Past experience with credit cards that used similar materials in their magnetic stripes indicated the data recordings can persist for years. A card reader, if passed sufficiently close to the "hard" magnetic core/medium 302 can read bit recordings 308-310.

Figure 4A:
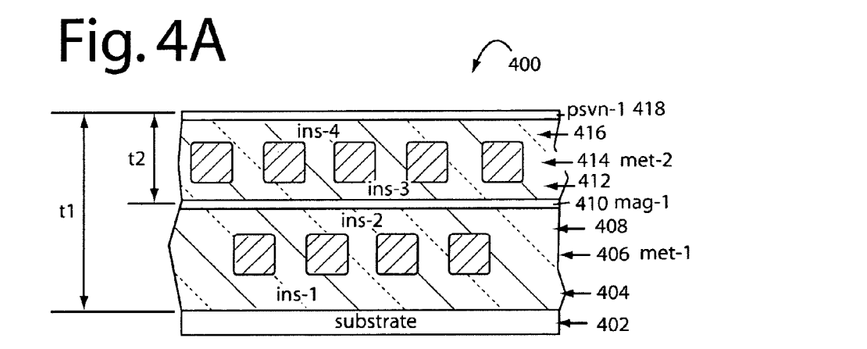
FIGS. 4A and 4B are longitudinal and lateral cross sectional diagrams of thin-film implementation of the Q-Chip MEMS magnetic device of FIG. 3.
Figure 4B:
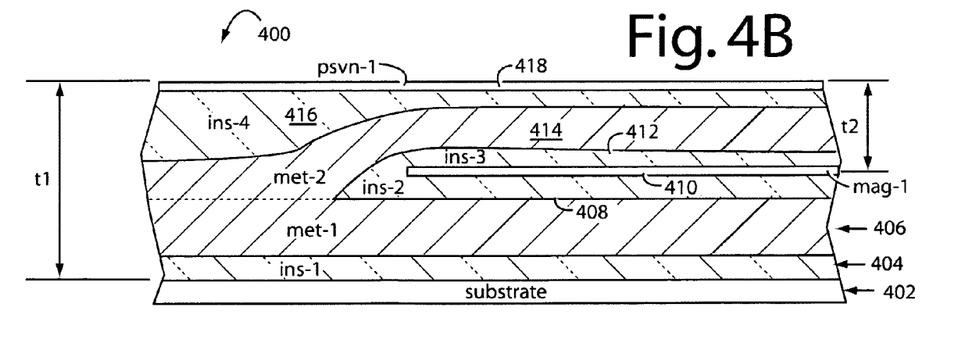

FIGS. 4A and 4B represent a thin-film Q-Chip magnetic device 400 similar to that of FIG. 3, with the hard magnetic core/medium. Such thin-film Q-Chip magnetic device 400 can be fabricated on a silicon substrate 402 by masking and depositing several layers. The total thickness of the finished device 400 is about 26-µm thick, and is shown in FIGS. 4A and 4B as dimension "t1". A first layer (ins-1) 404 is an insulator of about 2 micrometers (µm) thick. The insulator may be a polymeric material such as BCB (bisbenzocyclobutene), photoresist, or other material. The metal for the windings of the coils, e.g., 304-306, that wrap around the hard core 302, is deposited in two metallization steps. A first metal layer (met-1) 406 of copper (Cu) or other conductor is deposited about 8-µm thick. This forms the bottoms of the individual coil windings. Then a second insulation layer (ins-2) 408 is deposited, without a mask, about 5-µm thick. A hard magnetic core (mag-1) of a ferromagnetic material is deposited about 1-µm thick. For the magnetic core the material may be an alloy of Cobalt or Iron or Nickel, a binary alloy of CoFe or CoNi, or a ternary alloy consisting of at least one of these ferromagnetic materials. Such will eventually wind up being 13-µm to 19-µm deep from the finished surface, as shown in FIGS. 4A and 4B as dimension "t2". A third insulation layer (ins-3) 412 is deposited about 2-µm to 5-µm thick. A second metal layer (met-2) 414 of copper (Cu) or other conductor is deposited about 8-µm thick. This forms the tops of the individual coil windings, and these join with the bottoms formed in met-1 layer 406. A fourth insulation layer (ins-4) 416 is deposited about 2-µm to 5-µm thick, and requires no mask. A passivation overcoat (psvn-1) 418 of silicon nitride (SiN), silicon oxide ($SiO_2$), diamond-like carbon (DLC), or other hard material completes the steps, and is, about 0.05-µm thick. In all, six masks are needed. A swipe sensor can be formed on top of these, e.g., using patterns of aluminum or other conductors to form the electrical contacts permitting the detection of the presence of the legacy reader head. detection of the presence of the legacy reader head.

Figure 5:
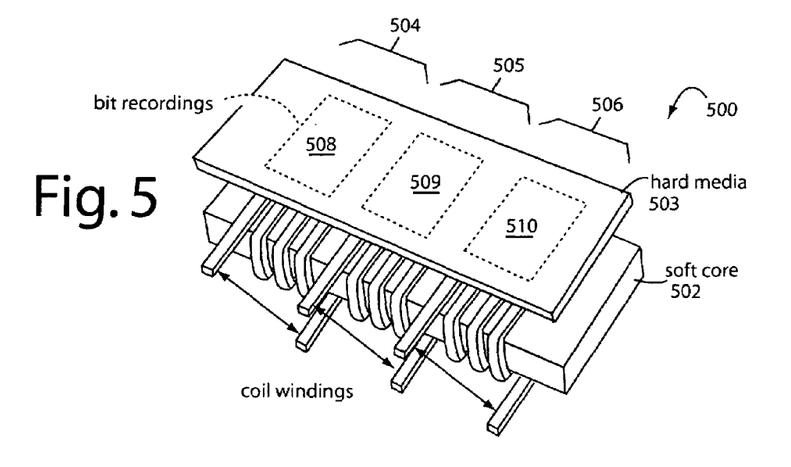
FIG. 5 is a perspective diagram of a Q-Chip MEMS magnetic device embodiment of the present invention that uses a soft magnetic core and a hard magnetic media with individual coil windings.

FIG. 5 represents a Q-Chip magnetic device 500 that uses a "soft" magnetic core 502. Here, the word "soft" is used to a magnetic material that has a very low coercivity, e.g., one Oe. A hard magnetic media 503, using material of about 50-600 Oe, is located just above. As such, magnetic data written by three representative coils 504-506 will persist as bit recordings 508-510. Such data recordings should be able to persist for years. A card reader, if passed sufficiently close to the "hard" magnetic media 503 can read bit recordings 508-510 long after power has been removed from the coils.

Figure 6A:
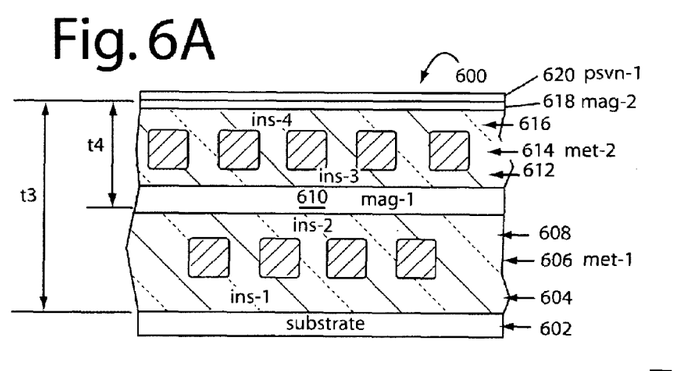
FIGS. 6A and 6B are longitudinal and lateral cross sectional diagrams of thin-film implementation of the Q-Chip MEMS magnetic device of FIG. 5.
Figure 6B:
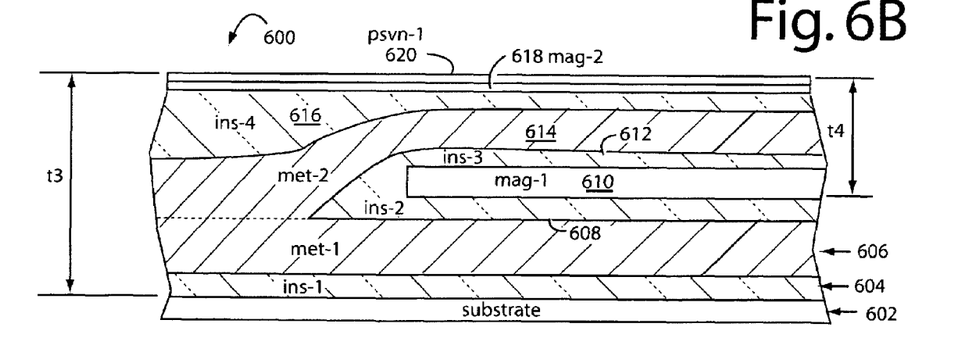

FIGS. 6A and 6B represent a thin-film Q-Chip magnetic device 600 similar to that of FIG. 5. Such Q-Chip magnetic device 600 can be fabricated using semiconductor thin-film techniques on a silicon substrate 602 by masking and depositing several layers. Compared to Q-Chip magnetic device 400, this device 600 will be more expensive to produce because its fabrication will require at least two more masks. And in operation, the energy efficiency may not be as good because magnetic data has to transfer from an energized core to the nearby media stripe. There may, however, be benefits that outweigh these added costs.

The total thickness of the finished device 600 is about 38-48 µm thick, and is shown in FIGS. 6A and 6B as dimension "t3". A first layer (ins-1) 604 is an insulator of about 2 micrometers (µm) thick. The insulator may be a polymeric material such as BCB (bisbenzocyclobutene), photoresist, or other material. The insulator may be a polymeric material such as BCB (bisbenzocyclobutene), photoresist, or other material. The metal for the windings of the coils, e.g., 504-506, that wrap around the hard core 502, is deposited in two metallization steps. A first metal layer (met-1) 606 of copper (Cu) or other conductor is deposited about 8-µm thick. This forms the bottoms of the individual coil windings. Then a second insulation layer (ins-2) 608 is deposited, without a mask, about 5-µm thick. A magnetically soft magnetic core (mag-1) of nickel-iron (NiFe) or other soft ferromagnetic material is deposited about 6-18 µm thick. Such will eventually wind up being about 22-µm deep from the finished surface, as shown in FIGS. 6A and 6B as dimension "t4". A third insulation layer (ins-3) 612 is deposited about 5-µm thick.) A second metal layer (met-2) 614 of copper (Cu) or other conductor is deposited about 8-µm thick. This forms the tops of the individual coil windings, and these join with the bottoms formed in met-1 layer 606. A fourth insulation layer (ins-4) 616 is deposited about 5-µm thick, and requires no mask. A hard magnetic medium layer (mag-2) 618 is deposited about 1-µm thick. For the magnetic medium the material may be an alloy of Cobalt or Iron or Nickel, a binary alloy of CoFe or CoNi, or a ternary alloy consisting of at least one of these ferromagnetic materials. A passivation overcoat (psvn-1) 620 of silicon nitride (SiN), silicon oxide ($SiO_2$), diamond-like carbon (DLC), or other hard material completes the steps, and is about 0.05-µm thick. In all, eight masks are needed. A swipe sensor can be formed on top of these, e.g., using patterns of aluminum or other conductor to form the electrical contacts permitting the detection of the presence of the legacy reader head.

Each Q-Chip MEMS magnetic device retains the individual magnetic domain orientations of each coil after the power is turned off. This differs from prior art devices that rely on magnetic solenoids with power kept on the entire transaction time. The prior art method requires a lot of power, and has heating issues with the coils, etc. Matching the signal levels of these coils with the neighboring static magnetic media is very difficult. Large steps in the signal amplitudes can easily occur during card swiping.

Method embodiments of the present invention burst energy to coils which are magnetically coupled to a hard media, e.g., a hard core or a hard top media with a soft core. The data written to the magnetic hard media will persist for a long time, perhaps even years. The Lo-Coercivity ISO standard in the credit card industry is 300 Oe. It was used for decades before the media was migrated to the Hi-coercivity standard of about 2500-4000 Oe. It is important to note that the readback signal generated from both the Lo-Co standard and the Hi-Co standard is roughly the same, and material with coercivities from several hundred Oe to several thousand Oe may be envisioned as the hard magnetic media in the present device.

Using a "hard" media of 50-600 Oe will get the data persistence needed, and at reasonably low writing currents. Keeping the writing currents as low as possible is important to long battery life and low per-unit production costs. While magnetization must persist until the signal is read by a card reader, if the data is accidentally erased by a stray magnetic field, it only requires another trigger event to re-write data to the media.

Alternative embodiments of the present invention may benefit their users by providing for the inductive coupling of programming data into the card's microcontroller backwards through the Q-Chip MEMS magnetic device coils. In practical applications, such will probably need only to be a one-time event. For security reasons, micro-links could be fused to prevent further programming.

In general, legacy card readers exploit Faraday's law of electromagnetic induction using a coil wound on a magnetic core with a non-magnetic gap. The recording medium of the magnetic stripe is scanned past the reader gap to produce a readback signal proportional to the rate of change in magnetic flux with time. The signal is typically about 1-3 mV per inch/sec of card speed past the reader head.

In usual practice, "permanent" magnetic data is written on magnetic stripes by moving the cards past a magnetic writing head. Such is attached to a source of writing current whose polarity is switched when clocking and data transitions are required. The Q-Chip MEMS magnetic device requires no motion relative to the recording medium, and is fixed underneath it to write many bits in a sequence. The writing transducer array and medium are static, small, and thin enough to be packaged in a standard credit card. It replaces a selected portion of the original "standard" recording medium of that card. The writing array within the Q-Chip sits on top of an ASIC device which provides the driving electronics, the sequencing logic, and a charge pump to control the programming current despite battery voltage. The ASIC is connected to a battery-powered microcontroller through a simple serial-type interface (clock, data, reset) so that the microcontroller can retrieve the next desired data pattern, and energize the coils to produce new (encrypted) data bit patterns along the magnetic medium.

The writing field is sufficient to erase old data and create new information in a selected region of the recording track in the storage medium. The energy consumed by the microprocessor, logic network, and writing array is compatible with a useful life of 1000-2000 write/read cycles when connected to an internal battery of 2-8 volts and about 10-30 mA-hours of current capacity. The recording medium can be designed for archival storage, or as a medium in which the magnetization patterns are allowed to thermally decay with time and can no longer be read back. An intentional erase after reading of the data is possible by simply repeating the process by which data is written, using a data sequence that may be, for example, all zeroes, or else a meaningless sequence of data bits.

In general, Q-Chip MEMS magnetic device embodiments of the present invention use pulsed electric current flowing in solenoidal coils wound around a magnetic core. Depending on the direction of current flow, the core is locally magnetized in either a North-South or a South-North polarity. The external magnetic field of the core magnetizes the recording medium which retains the polarity of the magnetic field even after the field is removed.

In one technique, after each bit transition in a complete word is written, a next coil in the writing sequence is addressed, and so on until all of the required transitions are written to the recording medium. Using this sequential bit-by-bit writing process, the brief current pulses flowing through the individual coils keep the maximum current drain on the battery to very low values. Smaller, less expensive batteries can therefore be used to save on unit costs.

The top layer may be covered with a protective overcoat of a hard material such as diamond-like-carbon (DLC), silicon nitride, or silicon oxide. This is shown in FIGS. 4A and 4B as protective overcoat 418, and in FIGS. 6A and 6B as protective overcoat 620. Overcoating with a scratch-hard material assures that in actual use environments the cards 102 and 200 will meet ISO 7811-6 requirements for wear of the magnetic strip, resistance to chemical attack, and reliable performance at temperature and humidity extremes. Specific environmental conditions which the device and card must survive include a temperature range of −35° C. to +50° C., and relative humidity between 5% and 95% RH. The diffusivity of moisture through the overcoat must be low enough that during the lifetime of the card, that moisture can not penetrate to corrode or oxidize the magnetic medium.

The magnetic media may be deposited on an underlayer of a non-magnetic material, e.g., chromium (Cr) or tantalum (Ta), to get the proper degree of adhesion to the substrate and the right crystallographic structure and orientation. This greatly influences the coercivity of the media and is a critical component of the device design.

Conventional credit card data encoding is so-called 2f(FM), or double-frequency self-clocking scheme. There are two magnetic elements in each data bit cell known as sub-intervals, and there are 5 bits/character of encoding on ABA Track #2, and 7 bits encoding/character in IATA Track #1. An all-ones series (11111) for a 5-bit numeric coded character set would therefore be encoded as 1111111111. An all-zeroes pattern (00000) records as 10101010101.

In a typical 40-bit Q-Chip MEMS magnetic device design, there are eighty magnetic coil elements, each for example with a length L. At recording densities of 75, 150, or 210-bits per inch, length L=170, 85, or 60.5-microns, and the total length of the entire array multiplies out to 13.6, 6.8, or 4.8 mm, respectively. At any chosen density, the coils must generate the required magnetic field to write the hard magnetic medium at a peak current that is compatible with the typical 2-8 volt battery voltage. Coil design depends very much on the circuit resistance and inductance. The required magnetic field dictates how much current is needed to generate this field, and such define the coil parameters and energy requirements.

The writing field ($H_w$) is a function of the recording medium coercivity ($H_c$). In many magnetic recording applications, $H_w$ is roughly 2-3 times $H_c$. But with very narrow switching field distributions, S* greater than 0.9, where $S^*=1-\Delta H/H_c$, an $H_w/H_c$ ratio of 1.5-2 is feasible. Sharper magnetic transitions correspond to narrow switching field distributions, thus both SFD and $H_c$ are design parameters.

In one design example, a target $H_c$ of 70-150 Oe, requiring an $H_w$ of roughly 100-300 Oe, 8 kA/m to 24 kA/m, allows the writing current to be kept compatible with a single battery voltage of 2-3 volts. The writing current can be estimated using Ampere's Law, H=ηNI/L, where η is the writing efficiency (about 0.50), N is the number of coil turns, I is the current (in Amps), and L is the coil length (in meters). For the given range 8-24 kA/m of medium coercivity, the required current is I=HL/(ηN)=(1.36 to 4.08)/N Amps, or 272-816 mA for N=5 turns, a writing efficiency η=0.50, and a coil length L=85-microns (150 bpi). To support the required current with a low voltage battery (2-V), the resistance (R=V/I) of the coil must be in the range of 2.45 to 7.35 ohms. The writing voltage is then pumped several times higher (6 to 8V) so the coil resistance is not such a limitation.

The coil thickness (T), the width of a turn ($W_c$), the coil pitch (P), and width of the written track (W) are important geometrical variables for the coil design. Copper (Cu) is preferred for the coil material because it has lower resistivity (ρ=1.724 μΩ-cm) than aluminum (Al) (2.824 μΩ-cm), and gold (Au) (2.44 μΩ-cm), and it withstands oxidation better than silver (Ag).

Coil resistance R is calculated from the sheet resistance $R_S$=ρ/T (ohms/square) of electro-plated Cu, multiplied by the number of squares for the coil N(2W/$W_c$). That is, R=2NWρ/($W_c$T) ohms. The ISO/IEC 7811 specifications require a reading track width W=1,500 μm (1.5 mm), so conductor width $W_c$, thickness T, and pitch P must be chosen judiciously to keep resistance down to a useful level. We have selected $W_c$=10-15 μm, T=8-12 μm, and P=17 μm with N=5 for a coil supporting L=85 μm (150-bpi design). A design for 75-bpi would have L=170 μm and N=10 turns. Nominal Cu coil resistances is approximately 2.6 and 5.2 ohms for N=5 and 10, respectively. These values are compatible with the earlier estimates given above for a two volt battery.

Without any magnetic core, the field generated above a flat solenoidal coil would be too weak to write magnetic data to the medium, e.g., hard media 503 in FIG. 5. The total field from the upper and lower coil layers is the vector sum of fields from currents flowing in opposite directions. An energized coil magnetizes an unsaturated magnetic core in proportion to the magnetizing field strength along the coil axis, and the core magnetization drops off with distance away from the ends of the coil. Variations in the level of core magnetization give rise to North and South magnetic poles within the volume and on the surface of the magnetic core. It is these poles within the core that are the source and sink of the magnetic field outside of the core. Gauss's Law for a magnetic medium says B=H+4πM and the divergence of M gives rise to the N (+) and S(−) magnetic charge densities in the core.

A soft magnetic material with high permeability ($\mu=4\pi M_s/H_K$) in the range of 200-10,000 is preferred for the soft core. There are a number of compositions in the NiFe Permalloy series of alloys which are potentially good core candidates. Electroplated $Ni_xFe_{1-x}$ with x close to 45% is a good candidate owing to its high moment and high permeability. Electroplated $Ni_xFe_{1-x}$ with x close to 80% is a good choice because it has 4π$M_a$ close to 10,000 Gauss, and $H_K$ in the range of 2-10 Oe, so 4 is in the range of 1000-5000. This material has very low coercivity, less than 5 Oe, a modest resistivity (ρ=20 μΩ-cm), and a low magnetostriction constant ($\lambda_S=-10^{-7}$ to $-10^{-6}$). Pair-ordering anisotropy is induced when a film is deposited in a magnetic field and such gives good control over the formation of magnetic domains for the material when it demagnetizes to a zero remanence state.

Electroplated NiFe films will normally have residual uniaxial tensile stresses directed along the long axis of the core, and stress anisotropy would compete with pair-ordering anisotropy if the magnetostriction constant is positive. For this reason, it is imperative that $\lambda_S$ be negative, or near zero, such that the easy axis remains aligned in the proper direction. With positive $\lambda_S$ and significant tensile stress, $10^9$ dynes/cm$^2$ or more, the easy direction of magnetization would lie along the stress axis and the device would not write magnetic transitions in the storage medium.

Core saturation is avoided by plating thick films in the range of 6-8 μm. Eddy currents flow when abrupt changes in magnetizing field are applied, so very thick films should be avoided, e.g., 10 μm or more. However, high resistance soft magnetic films with high magnetization may overcome the eddy current problem.

The cores in embodiments of the present invention do not have a closed path structure, and it is possible that shape anisotropy can affect the device performance. Micro-fabrication processes are used to pattern the core and achieve the necessary anisotropy by adjusting shape anisotropy.

With a coil pitch of 17-microns/turn, and 0.51 ohms/turn ($W_c$=T=10 μm, Cu resistivity ρ=1.726 μΩ-cm), the coil+core inductance scales as L=KN$^2$ with K estimated roughly at 5 nH/turn$^2$ for NiFe Permalloy core material. Table-I below indicates the approximate resistance and inductance to be expected for coils between 5 and 10 turns. Coil length along the core and the equivalent recording density (bpi=bits/inch) are also tabulated. The lowest resistance of course is expected with a one turn coil (N=1), but in such a case the inductance is also at its lowest point.

TABLE I

| | | Coil Properties | | |
|---|---|---|---|---|
| N | R (ohms) | L (nH) | Length (μm) | bpi |
| 5 | 2.6 | 125 | 85 | 150 |
| 6 | 3.1 | 180 | 102 | 125 |
| 7 | 3.6 | 245 | 119 | 107 |
| 8 | 4.1 | 320 | 136 | 93 |
| 9 | 4.6 | 405 | 153 | 83 |
| 10 | 5.1 | 500 | 170 | 75 |

A fixed-pitch, variable coil-turns approach supports a range of device designs and applications for the writing transducer. The excited transducer behaves as a series RLC circuit when attached electrically to an external charged capacitor (C) and switching transistors.

A 150-bpi design where the soft core is 6-microns thick, 6800-microns long (6.8 mm), and 1500-microns wide (1.5 mm) uses eighty solenoids, each five turns and 85 μm long. Preferably, a capacitor is slowly charged in about 100 μsec to the 2-volt battery voltage, then switched abruptly to the terminals of a selected coil e.g., through field-effect transistor (FET) switches. The discharge current rises quickly in about 100 nsec to a peak, and then decays slowly over 1 μsec as the capacitor completely discharges. The magnetic core magnetizes in the vicinity of the selected coil. There is an eddy current lag of roughly 50-nsec, and a peak writing field is reached in the plane of the magnetic recording medium. The current pulse shape depends on the circuit's series RLC circuit properties.

For a coil width of about 1500 μm, and a turn pitch of 17 μm, and if both top and bottom conductor layers are used to shift coil turns, then the skew angle will be θ=0.5 arctan (17/1500)=0.0057=19.5', and is just less than the ISO standard of 20'. If only the bottom conductor layer is used to shift the coil turns, and the top conductor lines are kept straight the effective skew angle will be further reduced.

The writing field is defined at the plane of the recording medium, about 20-μm above the top surface of the soft magnetic core, or at the plane of the hard core/medium. For a 10 μm thick soft NiFe core excited by one energized coil (at 333 mA peak current), a field of 16000 results given in units of amps/meter (79.6 amps/meter=1.0 Oe). Magnetic saturation occurs more readily for thin layers than for thick. Calculations comparing 4-μm with 10-μm thickness as a function of excitation current indicate the 4-μm soft core will saturate at about 200 mA for 75-bpi, and about 400 mA for 150 bpi. For this reason, thicker soft cores are preferred. For the hard core/medium design the medium is magnetized directly by the writing field of the coils, and the hard core/medium will be of the order of 1 to 2 μm.

The nominal soft core thickness for a preferred design is about 6-μm. Eddy current damping is exacerbated for NiFe cores much thicker than 6-μm. The effective magnetizing current waveforms $I_e(t,R,L,\beta)$ can be computed for various damping conditions. The damping parameter $\beta=(\pi\rho 10^9)/(4\mu T^2)$ (in radian/sec) is the inverse of the damping time constant ($\tau=1/\beta$), where ρ is the resistivity (ohm-cm), μ is the permeability (cgs), and T is the film thickness (cm). A nominal soft core device, $\rho=23$ μΩ-cm, $\mu=2500$, and $T=6\times10^{-4}$ cm, has about 10% loss in effective writing field. For $\rho=16$ μΩ-cm, $\mu=4000$, and $T=8\times10^{-4}$ cm, there is about a 40% loss in effective writing field.

Information in a digital magnetic recording medium is stored in the form of polarity reversals, or transitions, in the direction of the remanent magnetic flux of the recorded medium. For archival storage, the relevant magnetic properties of the recording medium are the coercivity ($H_c$ in Oersteds), remanence ($M_r$ in emu/cm$^3$), magnetic thickness (t in cm), and coercive squareness (S*, a dimensionless number). Low coercivity media can be written with low writing currents, but can suffer from unwanted erasures and demagnetizations. High coercivity media requires very high writing currents, and are not easily erased or demagnetized.

For Q-Card embodiments, H, is targeted between 50-600 Oe, favoring the lower end to conserve battery energy and thus extend the service life of the card.

The coercive squareness, S*, is a measure of the range (ΔH) of recording fields over which a medium switches ($S^*=1-\Delta H/H_c$), so ΔH should be small, and S* is close to 1.0, e.g., 0.7<S*<1.0.

The readback signal scales with the remanence-thickness product $M_r t$ (in emu/cm$^2$) of the medium. Typical "low coercivity" media support the ISO/IEC 7811 specification for signal amplitude. These media have $M_r t$ in the range of 30-100 milli-emu/cm$^2$, or memu/cm$^2$. About 80 milli-emu/cm$^2$ should be compatible with the majority of legacy card readers.

The hard media 503, FIG. 5, or hard core/medium 302, FIG. 3A, can be implemented with sputtered iron, sputtered cobalt, sputtered nickel, or alloys composed of these materials. These alloys may be binary or ternary, containing at least one ferromagnetic material and possibly containing additional materials such as Cr, Ta, Pt, or other nonmagnetic elements. Sputtering is the preferred deposition technique as it allows precise control of many deposition parameters. For example, the film properties will vary with angle of deposition, substrate temperature and surface conditions, deposition rate, gas phase composition, non-magnetic underlayer, and substrate bias. Sputtering process variations allow a wide range of control over the crystalline state of the deposited film, thereby influencing internal stress, crystallographic phase, magneto-crystalline anisotropy, and fimcoercivity.

One model for film growth assumes that the initial material deposited in the sputtering process is randomly oriented and consists of isolated grains or islands of magnetic material. These will switch more by magnetic domain rotation than by domain wall movement, and therefore will have an initially high value of coercivity. As the film thickness increases, the disorder of the initial layers transforms into a more ordered structure, and the film coercivity decreases. Subsequent increases in film thickness do not produce significant changes in coercivity, as the relative amount of material in the disordered state diminishes as a fraction of the whole.

The magnetic medium thickness should be greater than 0.1 um in order to reach an equilibrium or steady state crystallographic structure. Thicknesses of 0.1-1.0 μm seem preferable. The film easy axis should lie in the plane of the film, with the easy axis parallel to the long direction of the magnetic stripe. Alternatively, an isotropic magnetization in the plane of the film would also be acceptable.

Among the cobalt alloys, the CoFe alloy is especially suitable in terms of magnetization and controllability. Its $H_c$ can be adjusted by varying the fabrication conditions, as well as by adjusting the relative amounts of constituent Co and Fe. The $M_s$ can also be varied over a wide range by controlling composition. Certain CoFe compositions near the center of the binary phase diagram possess higher magnetic moments than is attributable to either Co or Fe individually, up to 2.45 Bohr Magnetons per atom, for example, whereas pure Fe has 2.22 and pure Co has 1.71 (Bozorth). The CoFe alloys also typically assume a cubic crystallographic structure (BCC or FCC), with a cubic family of magnetic easy axes. Another suitable alloy is CoNi, which has a lower saturation magnetization but which can typically provide a wider range of coercivities by variation in sputtering parameters. The lower magnetization of CoNi compared to CoFe can be compensated for by depositing a thicker film; for CoNi the medium will be of the order of 2 μm.

The magnetic media used in embodiments of the present invention can include an alloy of sputtered FeCo (30%-80% Co in Fe), with $M_r$ in the range of 1500 to 1900 emu/cm$^3$ at a film thickness "t" of 0.50 micron to 0.67 micron. In conventional magnetic stripe cards and tapes, a variety of particulate recording media exist (oxides of Fe, Ba, or Cr) with $M_r$ on the order of 100 emu/cm$^3$, and the media must be quite thick, e.g., 10 microns, in order to meet the signal requirements. The $H_c$ for these materials is in the range of 300-2400 Oe. Using conventional battery technology, sufficient writing fields for a medium with an $H_c$ of approximately 300 Oe are obtainable. Improvements in battery technology or pumping up the battery voltage will extend this coercivity range to the order of 600 Oe or more.

Typical storage media exhibit a thermal decay of the magnetic remanence. The decay rate is extremely sensitive to an energy barrier (ΔE) for thermally activated reversals in magnetic moment, and the decay time constant obeys an Arrhenius equation of the form $\tau=\tau_o \exp(\Delta E/kT)$, where $\tau_o$ is about one nsec (the reciprocal of the spin precession frequency in magnetic materials), k is Boltzmann's constant, and T is the absolute temperature (Kelvins). The energy barrier depends on the anisotropy (K in ergs/cc) that controls the medium coercivity and the volume (V in cc) of the crystallite (or particle) over which this anisotropy operates. That is, ΔE=KV. With magnetically independent particles, the superparamagnetic limit is approached as V becomes very small, so the thermal decay problem must be handled.

The particle (crystallite) volume (V) is used to control the useful thermal decay life of stored data. An "archival" storage device should have a time constant better than 10 years (ΔE/kT=KV/kT about 40). Temporary storage (KV/kT<40) has useful applications. The data stored in Q-chip media must remain useful long enough to allow the card to be swiped through a legacy card reader. This implies a time constant of a few seconds or more (KV/kT about 23), so the Q-chip medium can be designed with attention to the desired storage lifetime.

The magnetic data on credit cards is conventionally read by translating the stripe past an inductive read head gap at speeds in the range of 4-40 inches/second. The induced signal voltage is proportional to the speed, but will normally be in the range of 1-3 milli-volts (peak-to-peak), e.g., for a stripe speed of an inch per second in a legacy card reader with about 1500 turns, a gap length of twelve microns, and gap width of about 0.060 inch (1.5 mm).

The readback pulse amplitude and width are fundamental determinants of performance. The readback pulse can be described mathematically by the relation, $$e(x)=[8\cdot 10^{-8} N\eta v W M_r t/(d+a)]\cdot[1+(2x/(d+a))^2]^{-1} \text{ (volt)}$$

where, x=a position coordinate (cm) for the head and medium;
N=number of turns of the head coil;
η=head efficiency (dimensionless);
v=speed (cm/sec);
W=track width (cm);
$M_r$=remanence of medium (emu/cm$^3$)
t=thickness of medium (cm);
d=spacing between gap and medium (cm); and
a=transition parameter (cm)(transition length=πa).

The pulse width, full width at half maximum, is PW50=2 (d+a). Regardless of theoretical complexity, spacing (d) and transition parameter (a) always show up as the sum (d+a), so the implications for reading are that a broad written transition is equivalent to a large spacing between the head gap and medium, and the signal reduces in proportion to 1/(d+a). The transition parameter depends on the writing field, its gradient, the spacing (d), and it scales with the medium properties according to the relation $a_o=2M_r t/H_c$ with an additional dependence on the coercive squareness (S*) and switching field distribution.

Since the read signal scales with $M_r t$ of the medium, and $a_o$ scales with $M_r t/H_c$, the readback signal increases only when coercivity is increased in proportion to the medium $M_r t$. Otherwise, recording demagnetization spreads out the written transitions (increases 'a') until the demagnetizing field of the transition is equal to the medium coercivity. Various tradeoffs are involved in establishing a writing field that gives acceptable battery life, pushing $M_r t$ and $H_c$ as high as possible to reach a useful signal level, and a PW50 that support the desired recording density. To tradeoff transition parameter versus coercivity with spacing "d" as a parameter, the writing field is held at $H_w$ about $2H_c$, so coercivities greater than about 200 Oe may not be practical. A useful range of 20<a<35-microns for spacings 2<d<10-microns exists for $H_c$ near 100 Oe. It is anticipated that future improvements in batteries will allow coercivities of several hundred to several thousand Oe to be feasible.

The transition parameter "a" can be considered as the magnetic writing field ($H_x$) near or at a magnetic transition divided by the field gradient at that location. The parameter "a" can be made smaller by reducing the magnetic field, or by increasing the gradient. Field values were calculated for D=22 μm-6/2 μm=19 μm, the gradient of the field, and the transition parameter, along the x axis of a magnetic stripe. The maximum field, the maximum gradient, and the minimum value of "a" all occur at nearly the same point, namely, x=−42.5 μm, or x=+42.5 μm. The minimum value of the transition parameter is approximately at 20 μm, corresponding to a write field of 125 Oe.

Such implies that a design value of a=20 μm is appropriate, and it further implies that a hard medium can be optimized with respect to the writing field obtained from the soft core and coils. Prior art magnetic recording systems try to optimize writing currents based on the medium. It's better to optimize the medium based on the writing fields obtainable.

Typical readback parameters are: N=1500, v=75 cm/sec, η=1.0, g=12.5 μm, W=0.15 cm, $M_r$=1600 emu/cc, T=0.6 μm, d=2 μm, a=30 μm. At 150-bpi, the signal waveform for a 00001000 pattern with 2f(FM) is such that the isolated pulse (zero-to-peak) amplitude is 40-mV with PW50=65.8 μm, and at 150-bpi there is enough pulse overlap to reduce the signal to 72 mV (peak-to-peak). The zero-to-peak amplitude of the "one" bit is reduced to 28.6 mV.

For d=2 μm and a=20 μm, the isolated pulse improves to 57 mV (0-peak) and PW50=46.3 μm. For a 00001000 pattern at 150-bpi, the zero-to-peak amplitude of the "one" bit is reduced to 48.9 mV by interference with the adjacent clocking transitions. With reasonable control on spacing (d about 2 μm) and transition parameter ("a" about 20 to 30 μm), the estimated peak-to-peak signal is in the range of 2.4 to 3.7 mV per inch/second of speed.

There is a readback-signal loss with a soft magnetic core, e.g., keeper layer. While it is reasonable to consider the readback signal using traditional magnetic recording theory, in the current design the existence of a soft magnetic core below the magnetic medium adds more complexity. The soft Permalloy core, as a high-permeability material, will absorb or sap some of the flux from the transitions in the medium, reducing the readback signal.

Given the distance between a recording medium and a magnetic film core is D, and the distance of the medium from a read head is d, a soft magnetic film core, similar to a flux keeper, can be treated as a mirror by the method of images discussed by H. N. Bertram, *Theory of Magnetic Recording*, p. 31ff, Cambridge Univ. Press, Cambridge (1994).

If a soft core is magnetized by a recorded transition in a storage medium, the vertical component of magnetic field $H_{yc}$ at the distance D+d above it can be estimated by the transition's image, which is located D below the top surface of the core film. Thus, $H_{yc}$ can be approximated by, $$H_{yc} = -4M_r\delta/(D+D+d+a) \text{ (Oersted)}.$$

where, $M_r$ is the medium remanence (emu/cm$^3$), $\delta$ is its thickness, and "a" is the transition parameter which behaves as an increase in distance or spacing.

With a readback head at the distance "d" above a medium, and, without a keeper layer, the vertical field from a transition is, $$H_{y0} = 4M_r\delta/(d+a) \text{ (Oersted)}.$$

If the multiple magnetic images (or reflections) between the soft core (keeper) and the readback head poles are ignored, a first-order estimate of the signal field becomes, $$H_y = H_{y0} + H_{yc} = 4M_r\delta/(d+a) - 4M_r\delta/(2D+d+a),$$

or the field is decreased in the proportion of $1-(d+a)/(2D+d+a)$.

At least one prototype embodiment of the present invention operated with d=1-2 μm, a=20-30 μm, and D=16-22 μm (microns) showed a signal decrease no greater than 50% of its un-imaged value. If the recording medium has a sufficiently high Mrt then such a decrease should be acceptable in conventional card readers.

Figure 7:
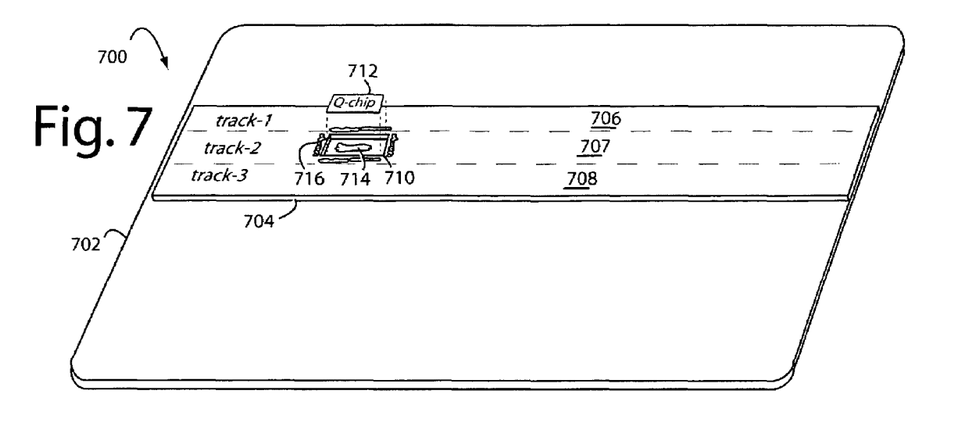
FIG. 7 is a cross-sectional view of a credit card sliced through the longitudinal length of the magnetic stripe and the Q-chip inlaid into magnetic Track-2.

FIG. 7 represents a credit card embodiment of the present invention, and is referred to herein by the general reference numeral 700. Credit card 700 includes a plastic substrate 702 that conforms to banking industry standards for credit, debit, and ATM cards. It further includes the familiar magnetic stripe 704 with three magnetic tracks, e.g., Track-2 706, Track-2 707, and Track-3 708. A rectangular recess 710 provides a place in which to cement-in a Q-Chip MEMS magnetic device 712 using a bedding of epoxy 714. A bead of epoxy 716 with dispersed magnetic particles is used to seal the edges and provide for a near seamless magnetic joint. It is important that the finished height of the Q-chip 712 and the bead of epoxy 716 be flat and level, or planar, with the surrounding area of magnetic stripe 704.

Figure 8:
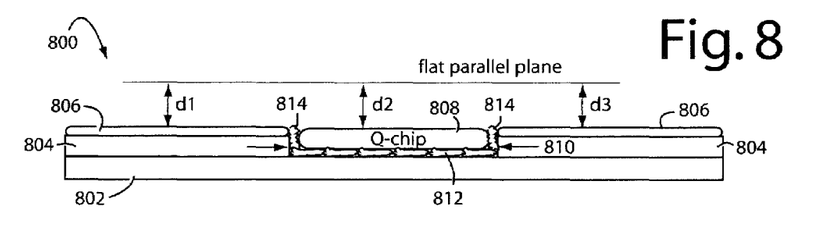
FIG. 8 is a perspective view of the credit card of FIG. 7 showing how the Q-chip is attached into the recess provided for it in Track-2, and how, for example, epoxy impregnated with magnetic material is used to provide a magnetically seamless joint.

FIG. 8 shows this in more detail. A credit card 800 comprises a substrate card 802 with a laminate 804 and a magnetic stripe 806. A Q-Chip MEMS magnetic device 808 is set into a close-fitting recess 810. It is attached by an epoxy bedding 812 and sealed along its perimeter by a bead 814. Such bead 814 includes material that magnetically matches the magnetic stripe 806 to the Q-chip 808 to limit the magnetic discontinuities a legacy card reader would observe during a card swipe. The finished surfaces of the credit card 800 over the area of Q-Chip MEMS magnetic device 808 must be very flat, this planar flatness is represented in FIG. 8 by dimensions d1=d2=d3.

On-board electronics are used to determine if the data in the Q-Chip MEMS magnetic device part of the magnetic stripe needs to be updated. The electronics drives each coil with a write pattern from coil-to-coil along the length. The coils' magnetic fields write the corresponding magnetic bits in the hard media or hard core, depending on model, e.g., device 300 or 500. The magnetic data will persist, so the electric current in the coils can be very brief and removed immediately. It does not matter if the legacy card reader has not yet read the data.

Figure 9:
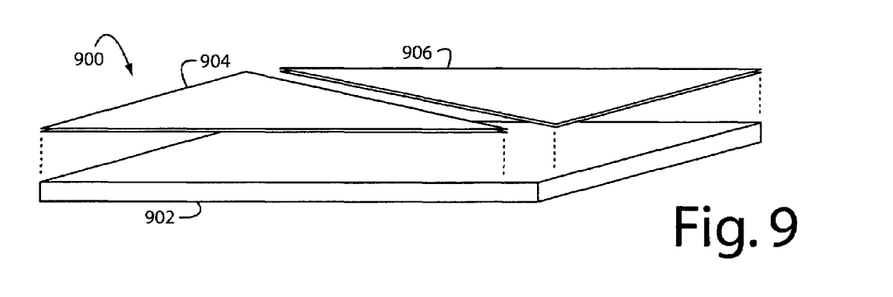
FIG. 9 is a perspective diagram showing a contact swipe sensor implemented as conductive foils over the top protective coating of a Q-Chip MEMS magnetic device.

In FIG. 9, a simple swipe sensor 900 can be integrated into the protective overcoat 902 of a Q-Chip MEMS magnetic device, e.g., 418 or 620 (FIGS. 4A-4B and 6A-6B), as a two-part electrically conductive film 904 and 906 that makes contact when a read head bridges them. Alternatively, two zones of the protective overcoat layer can be doped to make those zones semi-conductive, e.g., 10-ohms to 100K-ohms. An isolation barrier running diagonally along the length of the device would help guarantee that the read head would provide the required bridging contact somewhere along its length. The swipe sensor overlayers 904 and 906 are connected to the internal electronics by posts or vias, and debounced and clamped to prevent electrostatic discharge (ESD) damage. Integrating the swipe sensors 900 directly onto the Q-Chip MEMS magnetic device 702, 808, eliminates the more expensive alternative of installing swipe sensors on the card itself.

Figure 10:
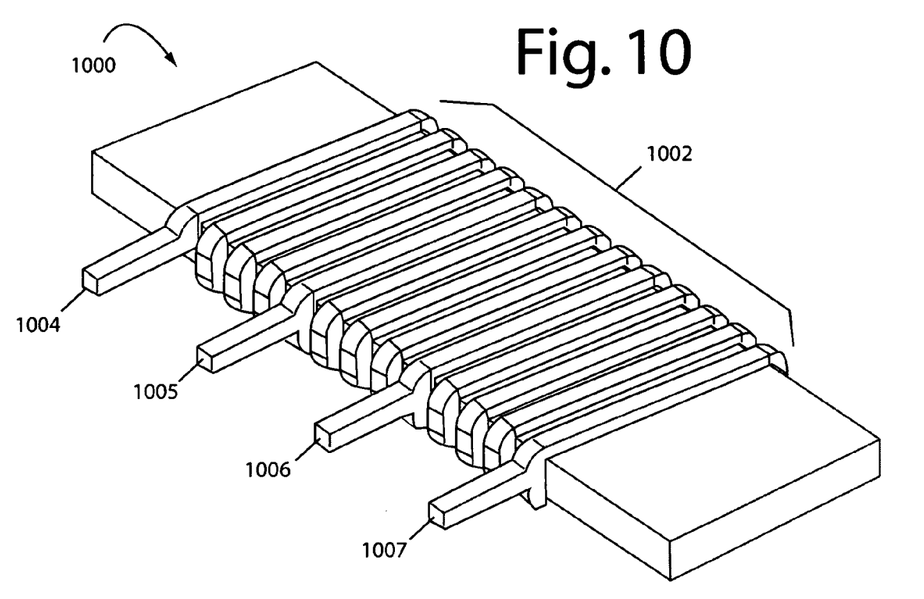
FIG. 10 is a perspective diagram of a Q-Chip MEMS magnetic device embodiment of the present invention that uses a hard magnetic core with tapped coil windings.
Figure 11:
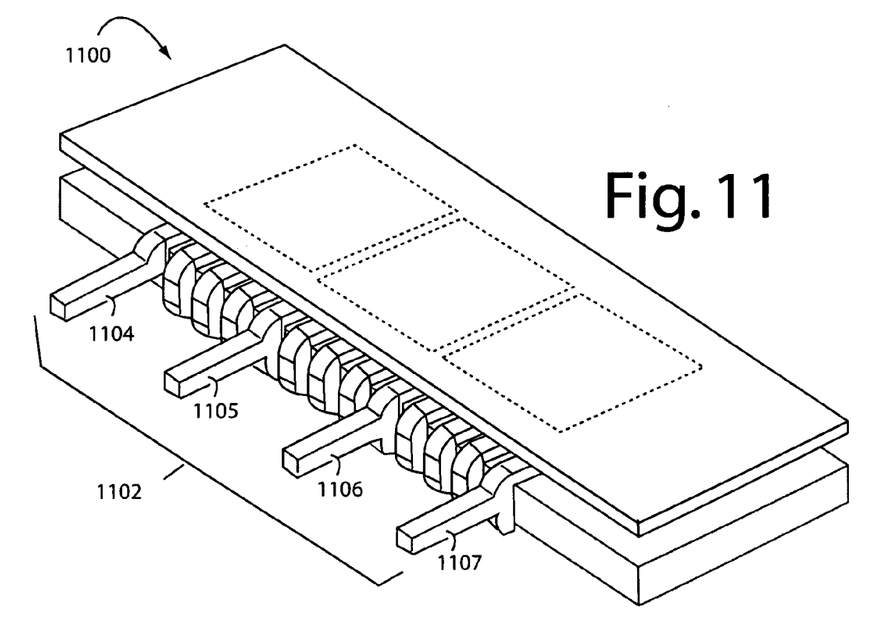
FIG. 11 is a perspective diagram of a Q-Chip MEMS magnetic device embodiment of the present invention that uses a soft magnetic core and a hard magnetic media with tapped coil windings.

FIGS. 10 and 11 represent variations on the construction of devices 300 and 500, in FIGS. 3 and 5, respectively. Here, instead of individual coil windings, a single tapped coiled is wound the whole length. E.g., coil 1002 with taps 1004-1007, and coil 1102 with taps 1104-1107.

In most application specific integrated circuit (ASIC) designs, the electronics are built-up on the substrate and pads are provided for the interconnect. Once the chip is complete, and diced, the chip is either wire-bonded to external circuitry, or solder bumps are added and the chip is flipped upside down and connected to the circuitry in that manner. Here, wire-bonding is cost prohibitive and difficult since the diameter of the wire exceeds or is near our MEMS feature sizes. Bumping is impossible since the chip cannot be flipped. The active area, on top of the chip needs to face away from the interconnect circuitry and toward the magnetic stripe. Various processes can be used to connect the electronics to underlying external circuitry through the backside of the wafer. Deep trench etching is one technique. The external pads are etched deep into the wafer. Once wafer processing is complete, the wafer is lapped from the backside to expose the pads. Then the wafer is bumped to provide interconnect paths. The chip is fastened using standard flip-chip techniques, except for the fact that the chip is not flipped.

Multiple parallel coils, of any of the designs presented, with identical parallel programming channels can be used in order to reduce the coil impedances for the same magnetics area, or increase the effective area without increasing coil impedance. This requires N times the number of drivers and parallel coils, and another charge pump. All of which draws more energy from the battery, which increase is roughly proportional to the increase in area.

Such technique may be useful to limit the number of stages in any charge pump or to increase the active area to better cover the entire track to allow for variances in read head positioning on the card reader install-base. The card reader read head is roughly half the width of the write track on the magnetic stripe. This allows for manufacturing tolerances between readers, and for small variations in card or head positioning during swipe transactions. The effective coil area of the Q-Chip magnetic device is roughly the width of the write track, in order to allow for these variances. But this increases the length of the windings accordingly, and increases the required voltage to maintain the desired current through the windings. The current has to be strong enough so the magnetic fields can reach the target field strengths that will magnetize the magnetic medium.

Multiple parallel windings would allow the stripe to be programmed using several parallel channels, thereby reducing the voltage requirement for any one channel. The current is, however, duplicated on adjacent channels, so that the energy required remains a function of the area being magnetized.

Also, multiple independent coils could be used to encode different data on different parallel tracks e.g., track-1 having one coil, track-2 another coil, etc. In such a scenario the Q-Chip would be large enough to span both tracks and each track would have a coil and a set of drivers that would be independent of each other (and ostensibly have different bit densities, thereby having different coil pitches and bit lengths). These coils would be treated completely independent programming channels and could operate synchronously or asynchronously to each other.

The internal impedance of traditional batteries is too high to discharge sufficiently large peak currents directly into the writing coils efficiently. Additionally the peak discharge currents we're considering by far exceed the maximum discharge currents of batteries that will fit our application. So, capacitors with very low internal source impedances are used as intermediaries to store the programming voltage and produce these peak programming currents. The capacitors are charged up using a battery discharge curve comfortably within the battery specification (say a few milliamps per second) until they reach the desired programming voltage and then this voltage is switched into the desired coil, in the direction desired in order to provide the domain orientation (magnetization) of that bit sub-interval. Then this process is repeated for all subsequent bit sub-intervals until the entire magnetic medium has been programmed.

As the batteries age, their ability to deliver energy diminishes. Temperature can also cause variations in the voltages and currents being delivered to the writing coils. The magnetic transition boundaries of the bits recorded in the Q-Chip magnetic device can therefore suffer from variations in field strength unless the programming voltage is reasonably constant for each bit sub-interval write cycle. Such variations can induce jitter of the bit transition boundaries between the Q-Chip device and the static magnetic stripe which can approach or exceed the ISO card transition jitter specs.

The solution is to keep the programming voltage reasonably constant despite the battery voltage and environmental conditions. If the programming capacitor(s) charge to a repeatable programming voltage the magnetic fields will be repeatable which will minimize this jitter at the Q-Chip/static-magnetic-stripe boundary.

There are other transition issues at the interfaces between the surrounding magnetic stripe, e.g., 806, and the Q-Chip magnetic device 808. Firstly, if the magnetic material on the static magnetic stripe 806 is boundary is written with a polarity opposite to the polarity to be written with the adjacent coil on the Q-Chip magnetic device 808, then the opposing flux lines (from the adjacent static magnetic stripe) will degrade the induced write field of the adjacent Q-Chip coils enough that data cannot be effectively written to the Q-Chip magnetic medium adjacent to that end of the coil.

So, the coils on both ends of the Q-Chip magnetic device are manufactured to be only half a bit, or a sub-interval. These special coils only have a transition in length with the other half of that transition being encoded on the static magnetic stripe. These coils are then always energized in the same orientation as their adjacent static magnetic stripe half transition area. Since the orientation is the same these flux lines aid with the magnetization of this area of the Q-Chip magnetic medium instead of degrading it. These half-transition coils are not part of the dynamic portion of the coil and as stated are always energized with same polarity as their adjacent static magnetic stripe corresponding half transitions.

Secondly, manufacturing processes will create gaps between the Q-Chip and the static magnetic stripe. If this gap is filled with non-ferrous material that cannot be magnetized (plastic, epoxy, etc) then there will be a gap in the magnetic flux lines that may cause problems for some readers. The previously defined half-transition coils and half-transition magnetic stripe areas polarized in the same orientation can help bridge these non-magnetized areas and mitigate any such problem. Alternatively the filler or glue used could be formulated such as to include some ferrous material allowing it to be somewhat magnetized and to avoid any such gap in the magnetic field.

In some cases when the writing coils are placed directly adjacent with each other, there may be difficulties in writing or erasing the entire Q-Chip magnetic medium. Since the writing field is not square and there is some slope to the sides of this field there can be areas between coils where the medium doesn't see a field with a signal amplitude high enough to erase/write it.

There are alternatives to address these issues. One technique is to always write two adjacent coils at time. Both coils are written with the same polarity (the polarity of the trailing coil in whichever direction we're sequencing the coils). This creates a larger flux line that spans two coils in length and erases any information encoded between these coils. The trailing coil actually encodes or doesn't encode the current transition and the leading coil erases any old transition that may exist before the writing/trailing coil gets there. This technique requires two separate programming channels (which can be connected to alternate coils).

Another alternative is to have overlapping taps on a long contiguous coil, as described in FIG. 10 and related text descriptions. In this scheme, the trailing side of the coil is used to write and the leading edge of the coil is used to erase (much as in the previous method). The coil field overlaps the actual bit sub-interval boundary on the leading side and is right on the bit sub-interval boundary on the trailing side. Therefore, we are erasing the inter-bit-transition space between the current sub-interval and the next sub-interval with each write and also writing the trailing transition (if one exists). This technique requires twice the number of taps and drivers in order to implement, though it can be done with a single programming channel.

Further levels of integration and cost reduction could be realized by integrating a microcontroller with the Q-Chip magnetic device. New battery technologies may allow a MEMS type battery to also be integrated into the Q-Chip magnetic device as well. The Q-Chip magnetic device might then be integrated directly into the magnetic stripe component itself, and affixed to the card in one step. Other technologies like contactless, etc could also feasibly be integrated.

An alternative substrate material to the silicon processing described herein is polymer and this will reduce cost and allow the entire stripe to be made dynamic and addressable.

Although particular embodiments of the present invention have been described and illustrated, such is not intended to limit the invention. Modifications and changes will no doubt become apparent to those skilled in the art, and such is intended that the invention only be limited by the scope of the appended claims.

The invention claimed is:

1. A magnetic data recording device, comprising:
a programmable magnetic device for presenting programmable and persistent magnetic data readable by a legacy card reader,
wherein, the programmable magnetic device is configured to be embedded in an opening in a magnetic stripe with a permanent magnetic data recording that is readable in combination with said programmable and persistent magnetic data by said legacy card reader;
wherein, programmable and permanent magnetic data are collectable and interpretable together as a valid use once account number in a single track data information.

2. The magnetic data recording device of claim 1, further comprising:
a plurality of writing coils collinearly wound around a common flat longitudinal magnetic core and providing a mechanism with which to record said programmable and persistent magnetic data.

3. The magnetic data recording device of claim 1, further comprising:
a plurality of writing coils collinearly wound around a common flat longitudinal magnetic core and beneath a magnetic media and providing a mechanism with which to record said programmable and persistent magnetic data.

4. The magnetic data recording device of claim 1, further comprising:
a plurality of writing coils collinearly wound around a common flat longitudinal magnetic core; and
a microcontroller connected to provide changeable data to the plurality of writing coils for recording said programmable and persistent magnetic data.

5. The magnetic data recording device of claim 4, further comprising:
a swipe sensor disposed over the plurality of writing coils and providing for a trigger to the microcontroller to provide a timing for recording said programmable and persistent magnetic data.

6. The magnetic data recording device of claim 4, further comprising:
an inductor for communicating externally sourced card personalization data to the microcontroller.

7. The magnetic data recording device of claim 1, further comprising:
a bead of magnetic material disposed in a joint between the electronic device and a magnetic stripe surrounding it, and for matching said magnetic stripe to the programmable magnetic device to limit any magnetic discontinuities a legacy card reader would observe during a card swipe.

8. The magnetic data recording device of claim 1, further comprising:
a silicon substrate on which are disposed a plurality of writing coils, and set flush within a recess in a magnetic stripe surrounding it, and providing a mechanism with which to record said programmable and persistent magnetic data.

9. A magnetic device comprising:
means providing for the reading of programmable and persistent magnetic data by a legacy card reader in combination with permanent magnetic data recordings in a surrounding magnetic stripe; and
a capacitor to receive a slow charge from a battery and to deliver a fast discharge to each of the plurality of writing coils sufficient to record repeatable magnetic data for a later reading by said legacy card reader.

10. A thinfilm magnetic device, comprising:
a substrate;
a first insulation (ins-1) layer deposited on the substrate;
a first metallization (met-1) layer deposited on the ins-1 layer, and comprising copper (Cu), and forming a bottom half of a number of individual coil windings;
a second insulation (ins-2) layer deposited on the met-1 layer, and comprising an insulative material deposited, without a mask;
a hard magnetic core (mag-1) of ferromagnetic alloy deposited about 1-μm thick over the ins-2 layer;
a third insulation (ins-3) layer deposited over the mag-1 layer, and comprising an insulative material;
a second metallization (met-2) layer deposited on the ins-3 layer, and comprising copper (Cu), and forming a top half of said number of individual coil windings;
a fourth insulation (ins-4) layer deposited over the mag-1 layer, and comprising an insulative material; and
a passivation overcoat (psvn-1) of relatively hard material deposited over the ins-4 layer;
wherein, the met-1 and met-2 layers form coil windings that encircle a magnetic core formed by the mag-1 layer, and such provide for the writing of magnetic data readable by a legacy card reader shuttled along the surface of the psvn-1 layer.

11. The thinfilm magnetic device of claim 10, wherein:
the first insulation (ins-1) layer deposited on the substrate includes bisbenzocyclobutene (BCB) or photoresist about two micrometers (μm) thick;
the first metallization (met-1) layer deposited on the ins-1 layer comprises copper (Cu) about 8-μm thick;
the second insulation (ins-2) layer deposited on the met-1 layer comprises BCB or photoresist deposited about 5-μm thick;
the hard magnetic core (mag-1) is a CoFe alloy deposited about 1-μm thick and has a coercivity of about 200-600 Oe;
the third insulation (ins-3) layer deposited over the mag-1 layer comprises BOB deposited about 2-μm to 5-μm thick;
the second metallization (met-2) layer deposited on the ins-3 layer comprises copper (Cu) about 8-μm thick;
the fourth insulation (ins-4) layer deposited over the mag-1 layer comprises BCB or photoresist deposited about 2-μm to 5-μm thick; and
the passivation overcoat (psvn-1) comprises silicon nitride (SiN), silicon oxide, or diamondlike carbon (DLC) deposited over the ins-4 layer about 0.05-82 m thick.

12. The thin-film magnetic device of claim 10, further comprising:
a conductive overlay on the passivation overcoat (psvn-1) to complete an electrical circuit to sense when a read head passes over.

13. A thin-film magnetic device, comprising:
a substrate;
a first insulation (ins-1) layer deposited on the substrate;
a first metallization (met-1) layer deposited on the ins-1 layer, and comprising copper (Cu), and forming a bottom half of a number of individual coil windings;
a second insulation (ins-2) layer deposited on the met-1 layer, and comprising an insulative material deposited, without a mask;

a soft magnetic core (mag-1) of deposited over the ins-2 layer, and having a coercivity of about one Oe;

a third insulation (ins-3) layer deposited over the mag-1 layer;

a second metallization (met-2) layer deposited on the ins-3 layer, and comprising copper (Cu), and forming a top half of said number of individual coil windings;

a fourth insulation (ins-4) layer deposited over the mag-1 layer;

a hard magnetic media (mag-2) of a ferromagnetic alloy deposited over the ins-4 layer; and a passivation overcoat (psvn-1) deposited over the ins-4 layer;

wherein, the met-1 and met-2 layers form coil windings that encircle a magnetic core formed by the mag-1 layer, and such provide for the writing of magnetic data to the mag-2 layer which is readable by a legacy card reader when shuttled along the surface of the psvn-1 layer.

14. The thin-film magnetic device of claim 13, wherein:

the first insulation (ins-1) layer deposited on the substrate comprises bisbenzocyclobutene (BCB) or photoresist about two micrometers (μm) thick;

the first metallization (met-1) layer deposited on the ins-1 layer comprises copper (Cu) about 8-μm thick;

the second insulation (ins-2) layer deposited on the met-1 layer comprises BCB or photoresist deposited, without a mask, about 5-μm thick;

the soft magnetic core (mag-1) of nickel-iron (NiFe) deposited about 6-μm thick over the ins-2 layer, and having a coercivity of about one Oe;

the third insulation (ins-3) layer deposited over the mag-1 layer comprises BCB or photoresist deposited about 2-μm to 5-μm thick;

the second metallization (met-2) layer deposited on the ins-3 layer comprises copper (Cu) about 8-μm thick;

the fourth insulation (ins-4) layer deposited over the mag-1 layer comprises BCB or photoresist deposited about 2-μm to 5-μm thick;

the hard magnetic media (mag-2) is CoFe or CoNi deposited about 1-μm thick over the ins-4 layer, and has a coercivity of about 200-600 Oe; and the passivation overcoat (psvn-1) comprises silicon nitride (SiN), silicon oxide, or diamondlike carbon (DLC) deposited over the ins-4 layer about 0.05-μm thick;

wherein, the met-1 and met-2 layers form coil windings that encircle a magnetic core formed by the mag-1 layer, and such provide for the writing of magnetic data to the mag-2 layer which is readable by a legacy card reader when shuttled along the surface of the psvn-1 layer.

15. The thinfilm magnetic device of claim 14, lastly further comprising:

a conductive overlay on the passivation overcoat (psvn-1) to complete an electrical circuit to sense when a read head passes over.

* * * * *